(12) United States Patent
Duong et al.

(10) Patent No.: US 11,608,784 B2
(45) Date of Patent: Mar. 21, 2023

(54) ACCESSORY GEARBOX FOR GAS TURBINE ENGINE WITH COMPRESSOR DRIVE

(71) Applicant: United Technologies Corporation, Farmington, CT (US)

(72) Inventors: Hung Duong, Unionville, CT (US); Marc J. Muldoon, Marlborough, CT (US); Gabriel L. Suciu, Glastonbury, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 384 days.

(21) Appl. No.: 16/274,340

(22) Filed: Feb. 13, 2019

(65) Prior Publication Data

US 2020/0256258 A1 Aug. 13, 2020

(51) Int. Cl.
*F02C 7/32* (2006.01)
*F01D 15/10* (2006.01)
(Continued)

(52) U.S. Cl.
CPC ................ *F02C 7/32* (2013.01); *F01D 15/10* (2013.01); *F01D 15/12* (2013.01); *F02C 3/113* (2013.01); *F02C 6/08* (2013.01); *F02C 7/185* (2013.01); *F02C 7/36* (2013.01); *F02K 3/06* (2013.01); *F05D 2220/76* (2013.01); *F05D 2260/211* (2013.01); *F05D 2260/213* (2013.01);
(Continued)

(58) Field of Classification Search
CPC .... F02C 7/32; F02C 7/185; F02C 7/36; F02C 6/08; F01D 15/10; F01D 15/12; F05D 2260/532
See application file for complete search history.

(56) References Cited

U.S. PATENT DOCUMENTS 7,942,079 B2 5/2011 Russ
8,074,455 B2 12/2011 Pierrot et al.
(Continued)

FOREIGN PATENT DOCUMENTS

EP 2390486 A2 11/2011
EP 3351769 A1 7/2018
(Continued)

OTHER PUBLICATIONS

European Search Report for EP Application No. 20157016.5 dated Jun. 23, 2020.

*Primary Examiner* — Andrew H Nguyen
(74) *Attorney, Agent, or Firm* — Carlson, Gaskey & Olds, P.C.

(57) ABSTRACT

A gas turbine engine has a low speed input shaft drives a first plurality of accessories. A high speed input shaft drives a second plurality of accessories. The first plurality of accessories rotating about a first set of rotational axes perpendicular to a first plane. The second plurality of accessories rotating about a second set rotational axes perpendicular to a second plane. The first and second planes extending in opposed directions away from a drive input axis. Compressed air is tapped and passes through a heat exchanger, then to a boost compressor, and then to at least one rotatable components in a main compressor section and a main turbine section. The boost compressor driven on a boost axis, which is non-parallel to the first set of rotational axes and the second set of rotational axes.

5 Claims, 3 Drawing Sheets

(51) Int. Cl.
    *F01D 15/12*     (2006.01)
    *F02C 7/36*     (2006.01)
    *F02C 3/113*     (2006.01)
    *F02K 3/06*     (2006.01)
    *F02C 6/08*     (2006.01)
    *F02C 7/18*     (2006.01)

(52) U.S. Cl.
    CPC .............. *F05D 2260/40311* (2013.01); *F05D 2260/532* (2013.01)

(56) References Cited

U.S. PATENT DOCUMENTS

| | | |
|---|---|---|
| 8,966,911 B2 | 3/2015 | Ress, Jr. et al. |
| 8,973,465 B2 | 3/2015 | Duong |
| 9,863,325 B2 | 1/2018 | Lemarchand |
| 2005/0183540 A1 | 8/2005 | Miller |
| 2009/0205341 A1* | 8/2009 | Muldoon ................. F02C 7/32 60/792 |
| 2013/0247539 A1* | 9/2013 | Hoppe .................... F01D 15/10 60/39.15 |
| 2015/0204246 A1* | 7/2015 | Peltier .................... F02C 7/32 74/416 |
| 2016/0245183 A1* | 8/2016 | Viel ........................ F02C 7/32 |
| 2017/0082028 A1* | 3/2017 | Duong .................... F02K 3/115 |
| 2018/0149091 A1 | 5/2018 | Howell et al. |
| 2018/0202368 A1 | 7/2018 | Suciu et al. |
| 2018/0223739 A1 | 8/2018 | Dubreuil et al. |

FOREIGN PATENT DOCUMENTS

| | | |
|---|---|---|
| EP | 3388651 A1 | 10/2018 |
| FR | 2921423 A | 3/2009 |

\* cited by examiner

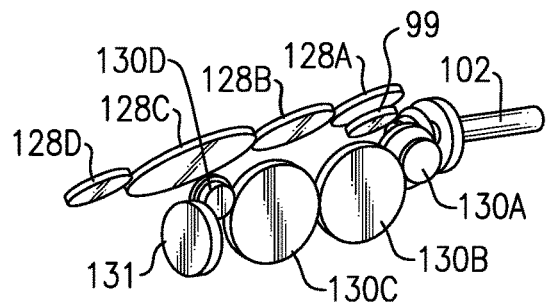
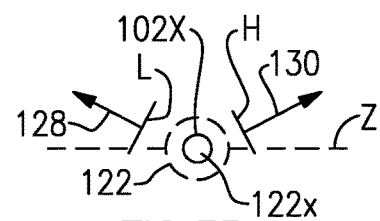
FIG.3A  FIG.3B
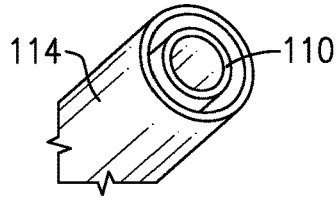
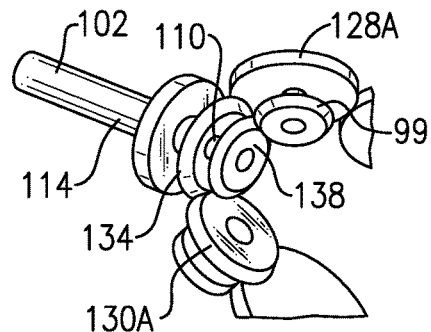
FIG.3C  FIG.3D
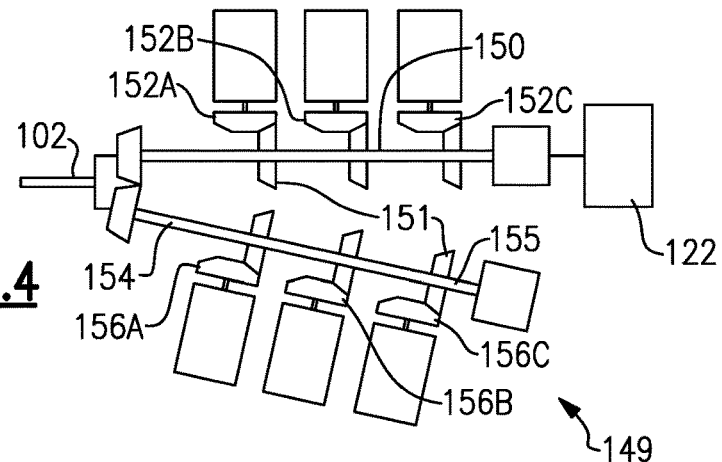
FIG.4
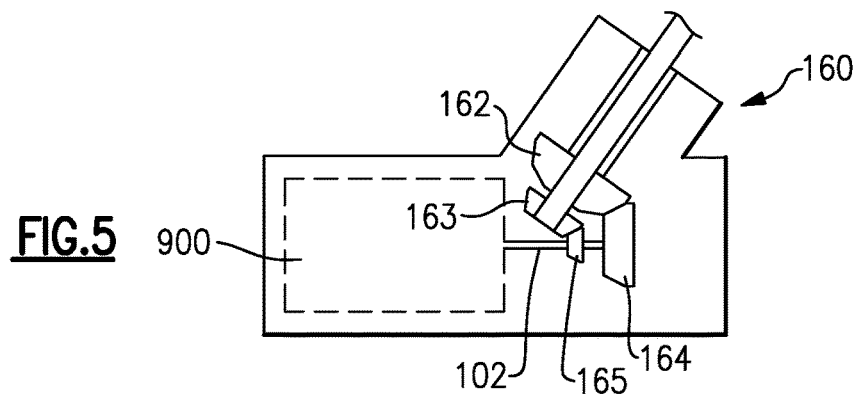
FIG.5

ACCESSORY GEARBOX FOR GAS TURBINE ENGINE WITH COMPRESSOR DRIVE

BACKGROUND

This application relates to an accessory gearbox for a gas turbine engine, wherein a drive for an intercooled cooling air boost compressor is included.

Gas turbine engines are known and typically include a fan delivering air into a bypass duct as propulsion air and into a compressor section. Air is compressed in the compressor section and delivered into a combustor where it is mixed with fuel and ignited. Products of this combustion pass downstream over turbine rotors driving them to rotate.

The turbine rotors drive a number of accessories associated with the gas turbine engine, or perhaps an associated aircraft through a tower shaft.

It is known for a gas turbine engine to have two spools, with a first rotating at lower speeds and lower pressures, and a second rotating at higher speeds and higher pressures. It has been proposed to drive accessories from tower shafts driven by each of the two spools.

As gas turbine engines become smaller, packaging for the gearboxes that transmit drive from the tower shafts to the various auxiliary systems becomes a challenge.

SUMMARY

In a featured embodiment, a gas turbine engine includes a low speed input shaft from a lower speed spool and a high speed input from a higher speed spool. The low speed input shaft is connected to drive a first plurality of accessories, and the high speed input shaft is connected to drive a second plurality of accessories. The first plurality of accessories rotate about a first set of rotational axes, which are parallel to each other but spaced along an axial input direction and are perpendicular to a first plane. The second plurality of accessories rotate about a second set of rotational axes, which are parallel to each other and spaced along an axial input direction and perpendicular to a second plane. The first and second planes extend in opposed directions away from a drive input axis of the high speed input shaft and the low speed input shaft. The main compressor section and the main turbine section each include at least one rotatable component. Compressed air is tapped from the main compressor section. The tapped air is passed through a heat exchanger, and then to a boost compressor. A connection downstream of the boost compressor is connected to supply cooling air to at least one of the rotatable components in the main compressor section or the main turbine section. The boost compressor is driven on a boost axis, which is non-parallel to the first set of rotational axes and the second set of rotational axes.

In another embodiment according to the previous embodiment, the boost axis is parallel to the drive input axis.

In another embodiment according to any of the previous embodiments, the boost axis is concentric with the drive input axis.

In another embodiment according to any of the previous embodiments, the low speed input shaft and the high speed input shaft are concentric.

In another embodiment according to any of the previous embodiments, the high speed input shaft is hollow and the low speed input shaft is positioned within the high speed input shaft.

In another embodiment according to any of the previous embodiments, each of the low speed and high speed input shafts drives a bevel gear and, in turn, the bevel gears drive gears to drive the first plurality of accessories and the second plurality of accessories, respectively.

In another embodiment according to any of the previous embodiments, each of the bevel gears drive a gear, which is engaged to drive another gear, and the another gear engaged to drive a third gear.

In another embodiment according to any of the previous embodiments, the low speed and high speed input shafts extend from input gears from the lower speed spool and the higher speed spool. The lower speed spool includes a low speed compressor driven by a low speed turbine and the higher speed spool includes a high speed compressor driven by a high speed turbine. The input gears from the high and low speed spool drive the low speed input and the high speed input shafts along concentric axes.

In another embodiment according to any of the previous embodiments, the low speed input shaft and the high speed input shaft each are driven by tower shafts for rotation about a tower shaft drive axis. The tower shaft drive axis is non-parallel to the drive input axis. The tower shafts drive the low speed input shaft and the high speed input shaft through an angle drive having bevel gears.

In another embodiment according to any of the previous embodiments, an input gear for the low speed input shaft drives a first low shaft with a plurality of bevel gears. Each of the bevel gears drive an associated drive gear for one of the first plurality of accessories. An input gear for the higher speed shaft drives a second high shaft with a plurality of bevel gears which each bevel gears driving an associated drive gears for one of the second plurality of accessories.

In another embodiment according to any of the previous embodiments, the second high shaft drives the boost compressor directly at an axial end of the second high shaft beyond each of the second plurality of accessories.

In another embodiment according to any of the previous embodiments, the low speed input shaft and the high speed input shaft are concentric.

In another embodiment according to any of the previous embodiments, the high speed input shaft is hollow and the low speed input shaft is positioned within the high speed input shaft.

In another embodiment according to any of the previous embodiments, each of the low speed and high speed input shafts drives a bevel gear and, in turn, the bevel gears drive gears to drive the first plurality of accessories and the second plurality of accessories, respectively.

In another embodiment according to any of the previous embodiments, each of the bevel gears drive a gear, which is engaged to drive another gear, and the another gear engaged to drive a third gear.

In another embodiment according to any of the previous embodiments, the low speed and high speed input shafts extend from input gears from the lower speed spool and the higher speed spool. The lower speed spool includes a low speed compressor driven by a low speed turbine and the higher speed spool includes a high speed compressor driven by a high speed turbine. The input gears from the high and low speed spool drive the low speed input and the high speed input shafts along concentric axes.

In another embodiment according to any of the previous embodiments, the low speed input shaft and the high speed input shaft each are driven by tower shafts for rotation about a tower shaft drive axis. The tower shaft drive axis is non-parallel to the drive input axis. The tower shafts drive the low speed input shaft and the high speed input shaft through an angle drive having bevel gears.

In another embodiment according to any of the previous embodiments, an input gear for the low speed input shaft drives a first low shaft with a plurality of bevel gears. Each of the bevel gears drive an associated drive gear for one of the first plurality of accessories. An input gear for the higher speed shaft drives a second high shaft with a plurality of bevel gears which each bevel gears driving an associated drive gear for one of the second plurality of accessories.

In another embodiment according to any of the previous embodiments, the second high shaft drives the boost compressor directly at an axial end of the second high shaft beyond each of the second plurality of accessories.

In another embodiment according to any of the previous embodiments, the at least one rotatable component is in the main turbine section.

These and other features may be best understood from the following drawings and specification.

BRIEF DESCRIPTION OF THE DRAWINGS

FIG. 3A shows drive details.
FIG. 3B schematically shows geometric relationships.
FIG. 3C shows a detail of an input.
FIG. 3D shows further details of the input.
FIG. 4 shows an alternative drive.
FIG. 5 shows yet another alternative.

DETAILED DESCRIPTION

Figure 1:
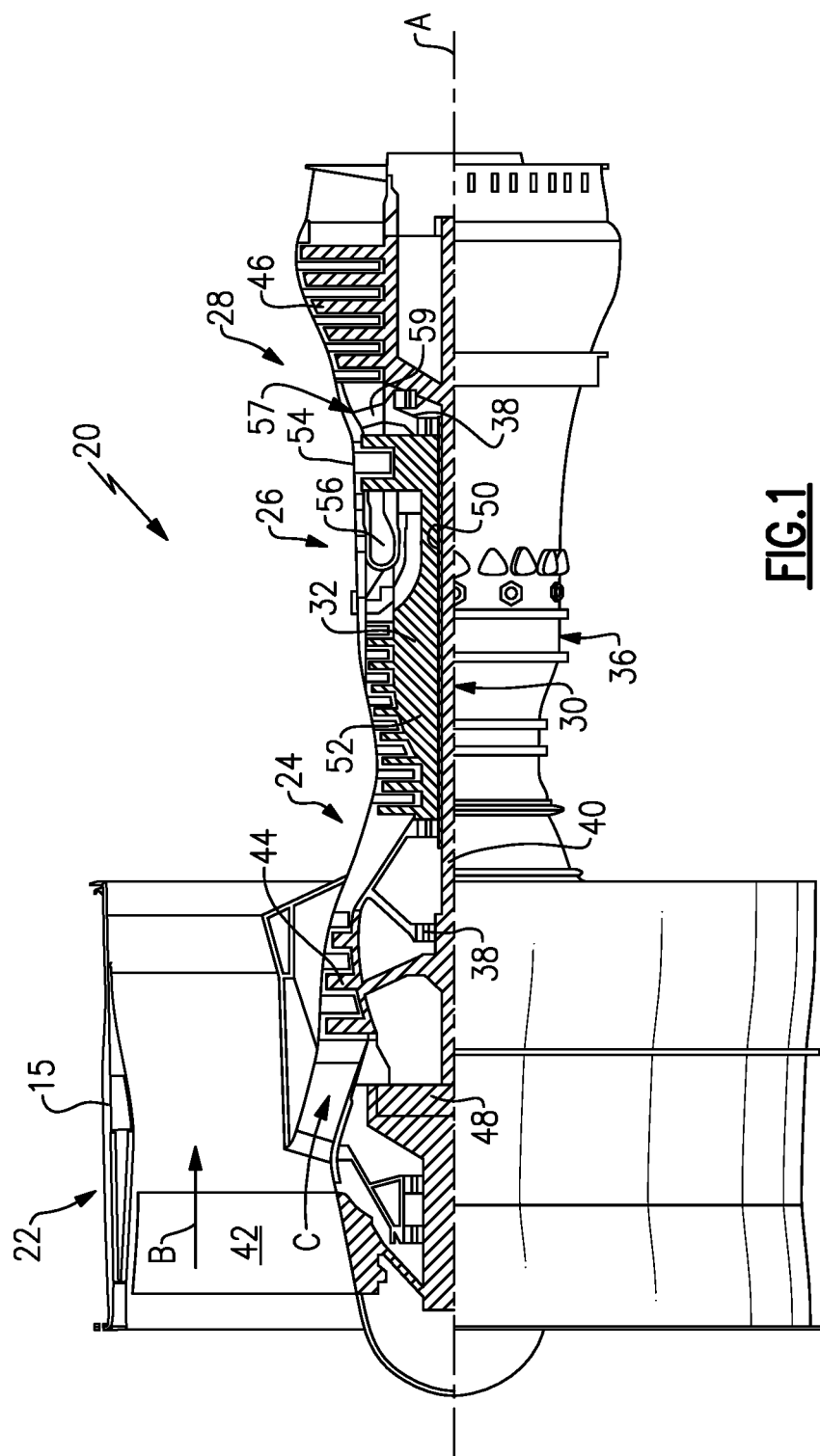
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram °R)/(518.7 °R)]^{0.5}$. The "Low corrected fan tip speed" as disclosed herein according to one non-limiting embodiment is less than about 1150 ft/second (350.5 meters/second).

Figure 2A:
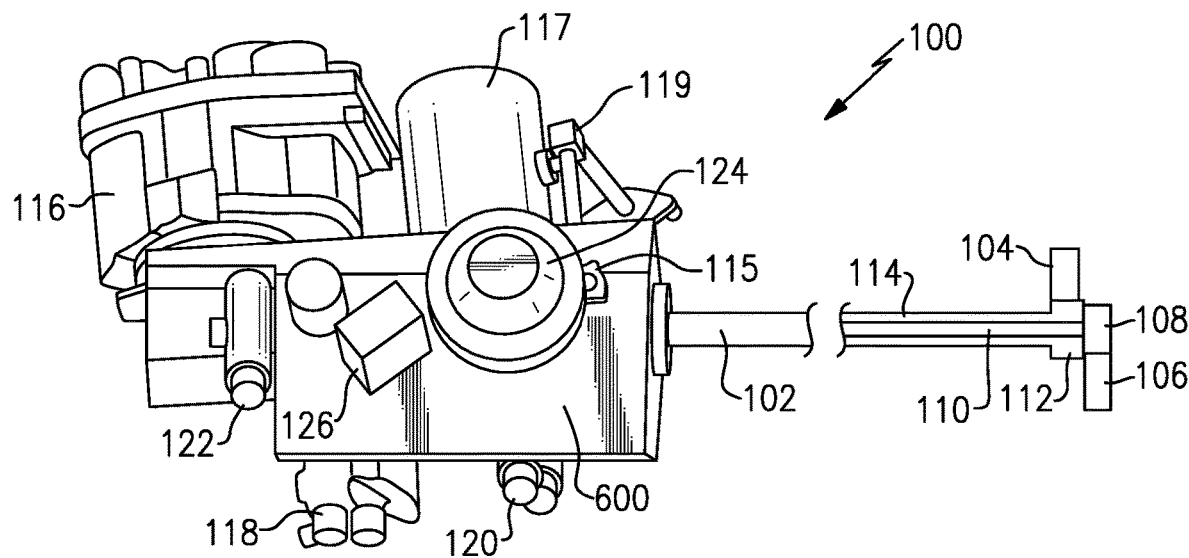
FIG. 2A shows an accessory gearbox.

An accessory gearbox 100 and drive system is illustrated in FIG. 2A. An input shaft 102 includes concentric inputs from both a low spool and a high spool, such as those in the engine of FIG. 1. Thus, a gear 104 may drive a gear 112 associated with a high speed input shaft 114. The shaft 114 is known as a lay shaft. A gear 106, associated with the low speed spool, may drive a gear 108 associated with an input shaft 110. Again, input shaft 110 may be what is known as a lay shaft. In the FIG. 2A embodiment, one can see the shafts 110 and 114 are concentric, with the shaft 110 positioned inside the hollow shaft 114. Further, the input 102 into the gearbox 115 includes the tower shafts 110/114.

As will be explained below, the accessories may include a generator 116, a variable transmission 117, an air turbine starter 124, a de-oiler 115, an oil pump 120, a hydraulic pump 118, and a fuel pump 126. Also, an intercooled cooling air boost compressor 122 is illustrated. In one embodiment, generator 116, variable transmission 117, a rotator tool 119, the oil pump 120, and the hydraulic pump 118 may all be driven by the low speed tower shaft 110. The de-oiler 115, air turbine starter 124, fuel pump 126, and the boost compressor 122 may be driven by the high speed tower shaft 114.

Figure 2B:
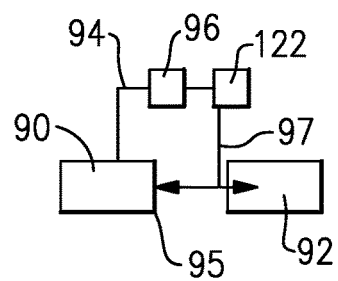
FIG. 2B shows a feature of a cooling air system.

FIG. 2B schematically illustrates an intercooled cooling air system. Such systems are known in the art and the teachings of this application relate to the positioning and drive for a boost compressor 122. A main compressor section 90 is shown along with a turbine section 92. A tap 94 taps compressed air from the main compressor section 90. The engine illustrated in FIG. 2B may be generally as shown in FIG. 1. The tap 94 is taken from the location upstream of a downstream most location 95 in the main compressor section. That is, tap 94 is at a location which has not been fully compressed. This air is passed through a heat exchanger 96 and may be cooled by air such as bypass air or by other cooling fluid. Downstream of the heat exchanger 96, the air passes to the boost compressor 122 and then at 97 into a core engine where it may cool the main compressor section 90 and/or the main turbine section 92. It could be said that both the main compressor section 90 and turbine section 92 include rotatable components and the cooling air at line 97 cools at least one rotating component in the main compressor section and/or the main turbine section.

FIG. 3A shows the input 102. The input lay shaft 114 drives gears 130A, 130B, 130C, and 130D. These gears all, in turn, drive the accessory such as shown in FIG. 2A. A bevel gear at the end of the gear 130D drives another gear 131, which is the drive gear for the boost compressor 122.

The input lay shaft 110 drives a plurality of gears 128A, 128B, 128C, and 128D. These gears then drive the several low speed driven auxiliary systems.

As can be appreciated from FIG. 3B, the gearbox could be said to be a V gearbox. The V gearbox is defined by two planes L and H. Gearbox plane L includes a plurality of rotational axes 128 of the gears 128A-128D. Plane H is the same, but with the rotational axes 130 of the gears 130A-130D. The axes 128A-128D extend perpendicularly through the plane L and are parallel to each other. The same is true for the axes 130A-130D in claim H. The planes L, H can be seen to define angles relative to a plane Z, which bisects the rotational axis 102X of the shafts 110 and 114. As can be appreciated, the angles defined by the planes L, H extend in opposed directions relative to the axis 102X. As is also shown in this figure, the boost compressor 122 rotates about a drive axis 122X. The boost compressor 122 rotates about a drive axis 122X, which is concentric with the axis 102X. With this arrangement all of this drive structure can be packaged in a single gearbox 600. While the illustrated embodiments have the axes concentric, the axes need not be concentric, or even parallel, FIG. 3C shows the lay shaft 110 packaged within the lay shaft 114.

FIG. 3D shows a bevel gear 138, which is driven by the shaft 110 to, in turn, engage and drive the bevel gear 99, and then the other gears 128A-D as shown in FIG. 3A. Input gear 99 provides a varying speed input into a variable transmission 117 and so that an output to gear 128A is over a narrower speed range. Similarly, a bevel gear 134 driven by shaft 114 drives bevel gear 130A and, in turn, the other gears 130B-D.

FIG. 4 shows an alternative embodiment 149. In embodiment 149, the input 102 drives a first shaft 150 extending along an axis and driving a plurality of bevel gears 151, which engage and drive a plurality of gears 152A-152C. In a sense, this arrangement replaces the engaged gears 130A-130D. Similarly, a shaft 154 drives bevel gears 155, which engage and drive a plurality of gears 156A-156C. In this arrangement, the boost compressor 122 is shown driven at the end of the shaft 150. Although the input 102 is not shown here it may be structured as in FIG. 3D. Bevel gears transmit rotation from shaft 114 to shaft 150, and bevel gears transmit rotation from shaft 110 to shaft 154.

FIG. 5 shows an alternative embodiment where rather than the tower shafts extending parallel into the gearbox, the tower shafts may drive an angle drive 160 having a bevel gear 162 and a bevel gear 163 driving gears 164 and 165, respectively, to provide the input 102. Input shafts 110/114, and an arrangement similar to that shown in FIG. 3D would be downstream of the input 102. Then, this would drive the accessory gearbox 900, similar to the FIG. 2 embodiment.

Returning to FIG. 3B, in combination, the V gearbox and the packaging of the boost compressor 122 such that it is driven on an axis which is distinct from the axes 128/130 in planes L, H provides more compact packaging, while adding the additional boost compressor 122. Again, a single gearbox 600 can now accommodate all of this structure.

A gas turbine engine coming under this disclosure has a low speed input shaft from a lower speed spool and a high speed input shaft from a higher speed spool. The input from the lower speed spool is connected to drive a first plurality of accessories. The input from the higher speed spool is connected to drive a second plurality of accessories. The first plurality of accessories rotates about a first set of rotational axes which are parallel to each other but spaced along an axial input direction of the high speed spool, and perpendicular to a first plane. The second plurality of accessories rotate about a second set of rotational axes which are parallel to each other but spaced along an axial input direction of the low speed spool, and perpendicular to. The first and second planes extend in opposed direction away from an input axes of the high speed input shaft and the low speed input shaft. There is a main compressor section and a main turbine section. The main compressor section and the main turbine section each including at least one rotatable component. A tap taps compressed air from the main compressor section, passes the tapped air through a heat exchanger, and then to a boost compressor. A connection downstream of the boost compressor is connected to supply cooling air to at least one of the rotatable components in the main compressor section or main turbine section. The boost compressor is driven on a boost axis which is non-parallel to the first set of rotational axes and the second set of rotational axes.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A gas turbine engine comprising:
a low speed input shaft from a lower speed spool and a high speed input shaft from a higher speed spool, said low speed input shaft being connected to drive a first plurality of accessories, and said high speed input shaft connected to drive a second plurality of accessories, said first plurality of accessories rotating about a first set of rotational axes, which are parallel to each other but spaced along an axial input direction and are perpendicular to a first plane and said second plurality of accessories rotating about a second set rotational axes, which are parallel to each other and spaced along said axial input direction and perpendicular to a second plane;
said first plane and said second plane extending in opposed directions away from each other to define a V-shape;
a main compressor section and a main turbine section, said main compressor section and said main turbine section each including at least one rotatable component, a tap for tapping compressed air from said main compressor section, passing said tapped air through a heat exchanger, and then to a boost compressor, a connection downstream of said boost compressor connected to supply cooling air to at least one of said at least one rotatable component in said main compressor section or said main turbine section;
said boost compressor driven on a boost axis which is non-parallel to said first set of rotational axes and said second set of rotational axes;
said low speed input shaft and said high speed input shaft are concentric, and said high speed input shaft is hollow with the low speed input shaft received within said high speed input shaft, and said boost axis is concentric with said low speed input shaft and said high speed input shaft; and
said boost compressor being driven by said high speed input shaft.

2. The gas turbine engine as set forth in claim 1, wherein each of said low speed and high speed input shafts drives a bevel gear and, in turn, said bevel gears drive accessory gears to drive said first plurality of accessories and said second plurality of accessories.

3. The gas turbine engine as set forth in claim 2, wherein each of said bevel gears drive a first gear in said accessory gears, which is engaged to drive another gear, and said another gear is engaged to drive a third gear, to drive each of said first plurality of accessories and said second plurality of accessories.

4. The gas turbine engine as set forth in claim 1, wherein said low speed and high speed input shafts extend from input gears from the lower speed spool and the higher speed spool, with said lower speed spool including a low speed compressor driven by a low speed turbine and said higher speed spool includes a high speed compressor driven by a high speed turbine, and said input gear from said high speed spool driving said high speed input shaft, and said input gear from lower speed spool driving said low speed input shaft along concentric axes.

5. The gas turbine engine as set forth in claim 1, wherein said at least one rotatable component is in said main turbine section.

* * * * *